United States Patent
Vega et al.

(10) Patent No.: US 6,252,508 B1
(45) Date of Patent: Jun. 26, 2001

(54) RADIO FREQUENCY IDENTIFICATION TAG ARRANGED FOR MAGNETICALLY STORING TAG STATE INFORMATION

(75) Inventors: Victor Allen Vega, Hercules; Noel H. Eberhardt, Cupertino, both of CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/432,894

(22) Filed: Nov. 2, 1999

Related U.S. Application Data

(63) Continuation-in-part of application No. 09/031,848, filed on Feb. 27, 1998, now abandoned, and a continuation-in-part of application No. 08/540,813, filed on Oct. 11, 1995, now abandoned.

(51) Int. Cl.[7] .................................................. G08B 13/14
(52) U.S. Cl. ...................... 340/572.1; 340/531; 340/539; 340/572.6; 361/437; 235/383; 235/385; 235/487; 343/741; 343/742; 343/779
(58) Field of Search ................................ 340/572.1, 531, 340/539, 572.6; 361/437; 235/383, 385, 487; 343/741, 742, 779

(56) References Cited

U.S. PATENT DOCUMENTS

| | | | |
|---|---|---|---|
| 3,843,036 | 10/1974 | Monahan et al. ........................ 228/6 |
| 4,783,646 | 11/1988 | Matsuzaki ............................. 340/572 |
| 4,900,386 | 2/1990 | Richter-Jorgensen ................ 156/250 |
| 4,970,495 | 11/1990 | Matsumoto et al. ................... 340/568 |
| 5,081,445 | 1/1992 | Gill et al. ............................... 340/572 |
| 5,175,418 | 12/1992 | Tanaka ................................ 235/439 |
| 5,288,235 | 2/1994 | Sobhani ................................. 439/67 |
| 5,430,441 | 7/1995 | Bickley et al. .................. 340/825.54 |
| 5,528,222 | 6/1996 | Moskowitz et al. ................. 340/572 |
| 5,566,441 | 10/1996 | Marsh et al. ............................ 29/600 |
| 5,682,143 | 10/1997 | Brady et al. .......................... 340/572 |
| 5,710,458 | 1/1998 | Iwasaki ................................. 257/679 |
| 5,786,626 | 7/1998 | Brady et al. .......................... 257/673 |
| 5,847,447 | 12/1998 | Rozin et al. ........................... 257/678 |
| 5,850,187 | 12/1998 | Carrender et al. .............. 340/825.54 |
| 5,854,480 | 12/1998 | Noto .................................... 235/492 |
| 6,001,211 | 12/1999 | Hiroyuki .............................. 156/277 |
| 6,040,773 | * 3/2000 | Vega et al. ......................... 340/572.1 |

FOREIGN PATENT DOCUMENTS

| | | |
|---|---|---|
| 40 17 934 C2 | 1/1992 | (DE) . |
| 0 245 196 A2 | 11/1987 | (EP) . |
| 0 260 221 A2 | 3/1988 | (EP) . |
| 0 260 221 A3 | 3/1988 | (EP) . |

* cited by examiner

*Primary Examiner*—Benjamin C. Lee
*Assistant Examiner*—Tai T. Nguyen
(74) *Attorney, Agent, or Firm*—Terri S. Hughes

(57) ABSTRACT

A radio frequency identification tag system (10) utilizes a radio frequency identification tag (16) that includes stored tag information. The tag includes an antenna element (30) and a common electrode (28). The antenna element electrostatically receives an exciter signal (34) from a proximately-located electrostatic exciter (12). Upon receiving the exciter signal, the tag becomes energized, thereby causing it to generate a read signal (36) based on the stored tag information. The antenna element then electrostatically sends the read signal to a proximately-located reader (14), which detects the stored tag information. In addition, exactly one of the tag common electrode and the tag antenna element is arranged to magnetically store tag state information. The tag state information represents exactly one state of two possible states and is read by a proximately-located magnetic reader (18).

12 Claims, 6 Drawing Sheets

RADIO FREQUENCY IDENTIFICATION TAG ARRANGED FOR MAGNETICALLY STORING TAG STATE INFORMATION

CROSS-REFERENCE TO RELATED APPLICATIONS

This is a continuation-in-part of prior U.S. patent application Ser. No. 08/540,813, filed Oct. 11, 1995 by Ted Geiszler et al., now abandoned, and entitled "Remotely powered electronic tag and associated exciter/reader and related method," the disclosure of which prior application is hereby incorporated by reference, verbatim and with the same effect as though such disclosure were fully and completely set forth herein. Also, this is a continuation-in-part of prior U.S. patent application Ser. No. 09/031,848 filed Feb. 27, 1998 by Victor Allen Vega et al. and entitled "Radio frequency identification tag system using tags arranged for coupling to ground," now abandoned, the disclosure of which prior application is hereby incorporated by reference, verbatim and with the same effect as though such disclosure were fully and completely set forth herein.

FIELD OF THE INVENTION

The present invention relates generally to the field of radio-frequency identification tags including, but not limited to, radio frequency identification tags arranged for magnetically storing tag state information.

BACKGROUND OF THE INVENTION

Radio frequency identification tags and radio frequency identification tag systems are known, and find numerous uses. For example, radio frequency identification tags are frequently used for personal identification in automated gate sentry applications protecting secured buildings or areas. Information stored on the radio frequency identification tag identifies the person seeking access to the secured building. Older systems require the person accessing the building to insert or swipe a programmed identification tag into or through a reader for the system to read the information from the identification tag. A radio frequency identification tag conveniently reads the information from the radio frequency identification tag at a small distance using radio frequency ("RF") data transmission technology eliminating the inserting or swiping operation. Most typically, the user simply holds or places the radio frequency identification tag near a base station, which is coupled to a security system securing the building or area. The base station transmits an excitation signal to the radio frequency identification tag that powers circuitry contained on the radio frequency identification tag. The circuitry, responsive to the excitation signal, communicates the stored information from the radio frequency identification tag to the base station, which receives and decodes the information. The read information is communicated to the security system and, if appropriate, access is granted to the individual. In general, radio frequency identification tags are capable of retaining and, in operation, transmitting a substantial amount of information—sufficient information to uniquely identify individuals, packages, inventory and the like.

A typical technology for powering and reading a radio frequency identification tag is inductive coupling or a combination of inductive power coupling and capacitive data coupling. Inductive coupling requires incorporating a coil element into the radio frequency identification tag. The coil element is excited (or "energized") by an excitation signal from a base station to provide power to the radio frequency identification tag circuitry. The radio frequency identification tag coil, or a second tag coil, may be used to transmit and receive the stored information between the radio frequency identification tag to the base station. Inductive coupling technology is relatively expensive, particularly for applications where it may be desirable to have a disposable radio frequency identification tag such as in an inventory management application. Radio frequency identification tags relying on inductive coupling are also sensitive to orientation of the radio frequency identification tag with respect to the base station since the field created by the excitation signal must intersect the coil element at substantially a right angle for effective coupling. Furthermore, read ranges for inductively coupled devices are generally on the order of several centimeters. Longer read distances are desirable, and for certain applications, such as electronic animal identification, baggage tracking, parcel tracking and inventory management applications, are necessary.

Other radio frequency identification tag technologies include magnetically coupled, magnetically and electrostatically coupled technologies. While offering certain performance enhancements, and in some cases cost advantages, over inductive coupling technology, read ranges with these other technologies remain unacceptably short. For example, in an electronic article surveillance ("EAS") system, it is necessary to read the radio frequency identification tag as it passes through a standard doorway. Similarly, because of the vast differences in sizes of parcels and baggage an ability to read the radio frequency identification tag at a substantial distance is imperative. As will be further appreciated orientation of the radio frequency identification tag with respect to the base station can not be prearranged, and therefore, can not be allowed to substantially effect read distances. Each of the mentioned technologies tends to be overly orientation sensitive.

Magnetic coupling technologies have found some success in EAS systems by providing sufficiently large read ranges. For example, a magnetic strip and detection technology is available from 3M of St. Paul, Minn. (sold under the product name "Tattle Tape"). The magnetic strips are small and thin thus allowing for easy insertion within the pages or spines of books, jewel cases of CDs, and the like. Magnetic strip technology, however, is information limited. That is, the magnetic strips are capable of providing only a single bit of information—typically indicating authorization yes/no for removal from the secured area. Magnetic strip technology is not capable of providing a sufficient amount of data for unique identification, and as such, is not suitable for automated inventory applications.

Magnetic strip technology is also not suitable for applications where the protected media is magnetic in nature. The magnetic strip is coded and decoded by subjecting the strip to a magnetic field. Subjecting magnetically recorded media, such as videotape, recorded audio tape, computer diskettes, and the like to magnetic fields may damage the recorded media.

Another important consideration for EAS system operation is read time. A person attempting to illegally remove an article from a secured area is likely not to pause while passing through a sensing area of the surveillance system to allow the system time to read the surveillance tag. Magnetic strip technology offers fast read times; however, radio frequency identification tag systems may not offer sufficiently fast read times, e.g., tag excitation, data transmission, data verification and finally authorization, to be effective in EAS systems.

Still, radio frequency identification tag technology offers the significant advantage of storing and conveying sufficient information so as to uniquely identify persons, retail articles, parcels, packages, baggage and the like. However, radio frequency identification tag technology is limited in application by cost, read range and read time. Magnetic strip technology offers the advantage of long read range, and based upon the limited amount of data conveyed, fast verification. But because of the limited amount of information it is capable of conveying, magnetic strip technology is limited in application.

Thus, there is a need for an improved radio frequency identification tag.

BRIEF DESCRIPTION OF THE DRAWINGS

Preferred exemplary embodiments of the invention are illustrated in the accompanying drawings in which like reference numerals represent like parts throughout.

DESCRIPTION OF THE PREFERRED EMBODIMENTS

Radio frequency identification tag systems in accordance with preferred embodiments of the present invention utilize radio frequency identification tags having at least one electrode or antenna element arranged for storing magnetically programmable tag state information. The programmed tag state information is quickly detectable within the radio frequency identification tag system and at an increased read distance. In addition, the radio frequency identification tag includes at least one antenna element arranged for electrostatically receiving an excitation signal and for electrostatically sending a read signal. Hence, performance is greatly enhanced in that authorization data, for example, is quickly detected at far greater distances and identification data may be read from the radio frequency identification tag.

Figure 1:
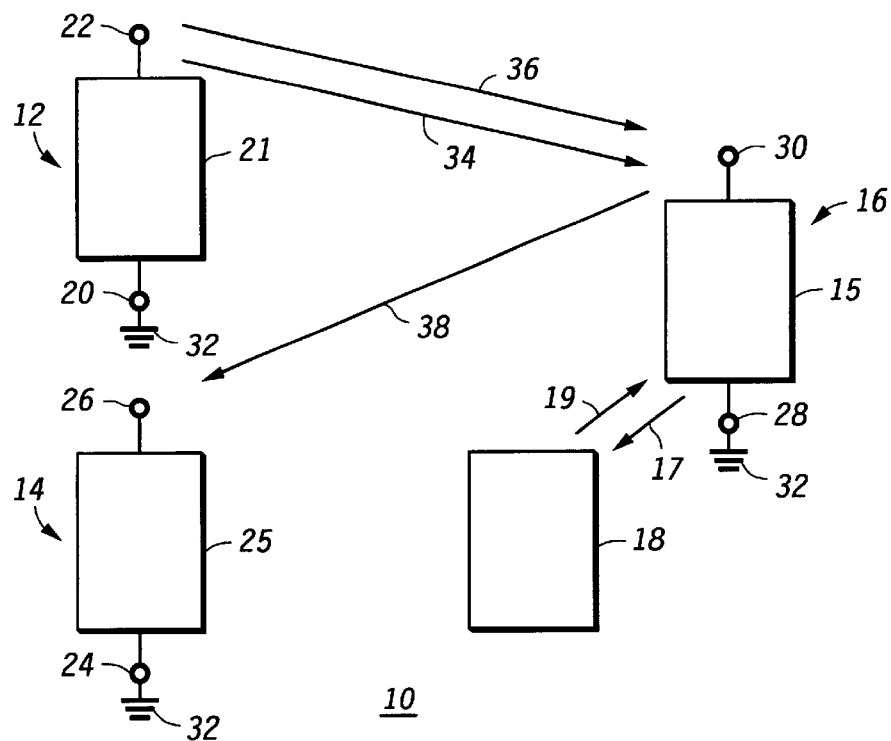
FIG. 1 is a block diagram illustration of a radio frequency identification tag system in accordance with a preferred embodiment of the present invention.

With reference to FIG. 1 of the drawings, a radio frequency identification tag system 10 includes: 1) a proximately-located electrostatic exciter 12, 2) a proximately-located electrostatic reader 14, 3) a radio frequency identification tag 16 and 4) a proximately-located magnetic reader 18. Electrostatic exciter 12 includes an exciter common electrode 20 and an exciter antenna element 22 coupled to an exciter circuit 21. Electrostatic reader 14 includes a reader common electrode 24 and a reader antenna element 26 coupled to a reader circuit 25. Radio frequency identification tag 16 includes a tag common electrode 28 and a tag antenna element 30 coupled to a tag circuit 15. In the preferred implementation of the invention shown, exciter common electrode 20, reader common electrode 24 and tag common electrode 28 are coupled to ground 32.

Electrostatic exciter 12 provides an exciter signal 34. When radio frequency identification tag 16 is proximate to electrostatic exciter 12, exciter signal 34 is electrostatically coupled, through the air, from exciter antenna element 22 to tag antenna element 30. Radio frequency identification tag 16 becomes energized based upon exciter signal 34. In accordance with the tag circuit 15 and stored tag information of radio frequency identification tag 16, radio frequency identification tag 16 generates a read signal 38 containing some or all of the stored tag information, which is communicated from tag circuit 15 to tag antenna element 30. Read signal 38 is electrostatically coupled from tag antenna element 30 to reader antenna element 26. Electrostatic reader 14 receives read signal 38, demodulates/decodes read signal 38 to recover the stored tag information therefrom and, as appropriate, communicates the stored tag information to other system elements (not shown). In a preferred implementation, read signal 38 is a reflected signal modulated by means of reflected load modulation based upon the stored tag information. It will be appreciated that other forms of modulation such as amplitude modulation (AM), frequency modulation (FM) or phase modulation (PM) may be used to convey the stored tag identification.

Electrostatic exciter 12 may be advantageously constructed from available tag exciter circuitry, such as for example, Motorola Indala's ASR-120 base station (part no. 05200-006 available from Motorola Indala Corporation, 3041 Orchard Parkway, San Jose, Calif. 95134).

The ASR-120 device is adapted by forming and coupling a suitable exciter electrode, for example a copper plate electrode, to one of the dipole electrode connections thereby forming the exciter antenna element 22. The other dipole electrode connection is coupled to earth thereby forming exciter common electrode 20. As the ASR-120 is also adaptable to receive from a radio frequency identification tag the read signal, one will appreciate that it may be further adapted to include the reader antenna element coupled to the read electrode connection.

Figure 5:
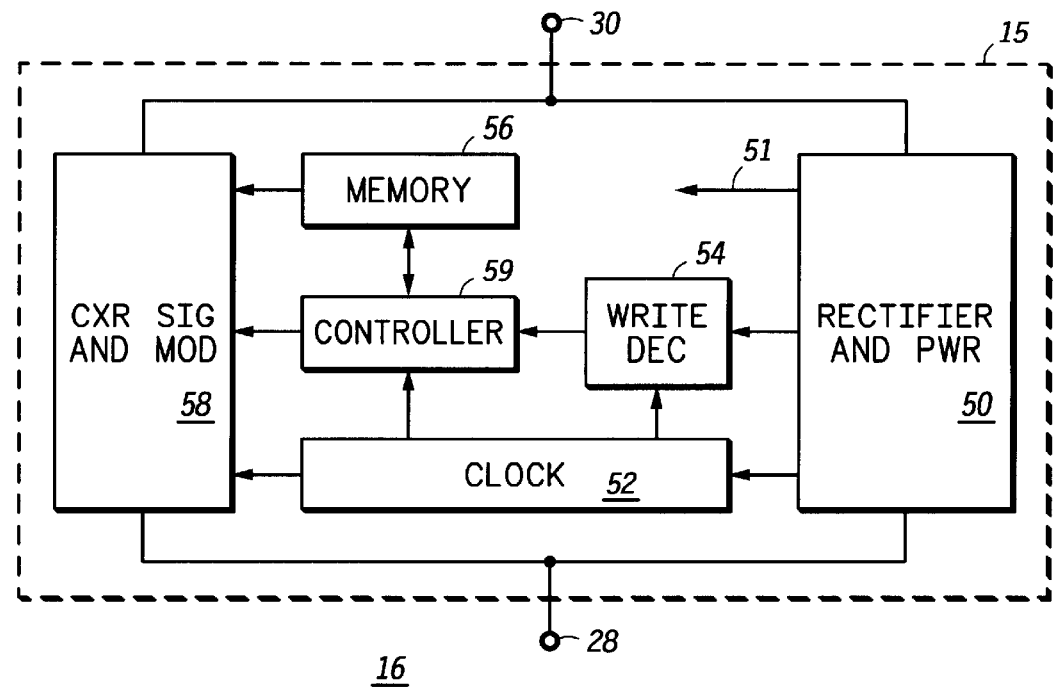
FIG. 5 is a block diagram illustration of a radio frequency identification tag in accordance with a preferred embodiment of the present invention.

Referring now to FIG. 5, in a read/write embodiment of the present invention radio frequency identification tag is advantageously constructed from a TEMIC e5550 circuit chip (available from Temic North America, Inc., Basking Ridge, N.J.). In this regard, and with reference to FIG. 5, tag circuit 15 includes operatively coupled: 1) a rectifier and tag power circuit 50, 2) a clock circuit 52, 3) a write decoder circuit 54, 4) a memory 56, 5) a carrier signal and/or modulator circuit 58 and 6) a controller 59. More particularly, tag antenna element 30 is coupled to both rectifier and tag power circuit 50 and to carrier signal and/or modulator circuit 58, which in turn are respectfully coupled to tag common electrode 28. Rectifier and tag power circuit 50 receives exciter signal 34 via tag antenna element 30 and provides a direct current (dc) power supply 51. Exciter signal 34 is further coupled via rectifier and tag power circuit 50 to write decoder circuit 54 and clock circuit 52. Clock circuit 52 provides a clock signal to each of write decoder circuit 54, carrier signal and/or modulator circuit 58 and controller 59. Memory 56 retains the stored tag information and is accessed by controller 59 and carrier signal and/or modulator 58. Upon excitation, carrier signal and/or modulator circuit 58 generates read signal 38 with the appropriate modulation and couples it to tag antenna element 30. As described, read signal 38 is preferably a reflected signal modulated via load modulation. It will be appreciated, however, that other modulations, such as amplitude modulation (AM), frequency modulation (FM) and phase modulation (PM) may be used to convey the stored tag information. In an alternate, read-only embodiment, the Indala I341 circuit chip available from the aforementioned Motorola Indala Corporation may be used. It will be appreciated that in this embodiment write decoder circuit 54 is not included.

Tag common electrode 28 is arranged to couple to ground. In a preferred embodiment (not shown), tag common electrode 28 may be arranged to couple to a person or an animal. In this manner, tag common electrode 28 is coupled to ground by means of the person or animal. Tag common electrode 28 may also be arranged to couple to an article (not shown). In this manner, tag common electrode 28 is coupled to ground by means of the article. In preferred applications, the article may be a loaned, leased or rented article, such as, for example, a video medium, an audio medium, a computer program, a computer game, a video game or a book. The article may also be a retail sales article such as, for example, an item of clothing such as a dress, skirt, blouse, shirt, pair of jeans, coat, pants, or other garment.

In accordance with a preferred embodiment of the present invention, exactly one of the tag common electrode 28 and the tag antenna element 30 is arranged for magnetically storing tag state information. The tag state information is representative of exactly one state of two possible states. In this regard, exactly one of the tag common electrode 28 and the tag antenna element 30 is formed from a magnetic strip. The magnetic strip is preferably a single bit EAS magnetic strip—a suitable magnetic strip material being the aforementioned 3M magnetic strip sold under the product name Tattle Tape. The magnetic strip is arranged as a single bit EAS strip for storing the magnetically programmable tag state information. The magnetic strip is further arranged, as appropriate, as an effective tag common electrode 28 and/or a tag antenna element 30 for operation as described.

As shown in FIG. 1, radio frequency identification tag system 10 includes, in addition to proximately-located electrostatic exciter 12 and proximately-located electrostatic reader 14, a proximately-located magnetic reader 18. When radio frequency identification tag 16 is proximate magnetic reader 18, magnetic reader 18 reads the magnetically stored tag state information and conveys that information to EAS system elements (not shown). Magnetic reader 18 provides an excitation signal 19. Depending on the programming state of the magnetic strip, the magnetic strip will resonate producing a resonant signal 17. Resonant signal 17 is detected by magnetic reader 18 to determine the tag state information.

In a preferred embodiment, a first state of the two states may indicate that an article is authorized for removal from the secured area while a second of the two states may indicate that the article is unauthorized for removal from the secured area. The magnetically programmed nature of the tag state information permits high sensitivity detection. Under general operation, the stored tag state information within radio frequency identification tag 16 is used for asset identification and/or inventory control. For EAS, the high sensitivity of magnetic reader 18 for detecting the magnetically-programmed tag state information provides effective article security.

With continued reference to FIG. 1 and FIG. 5, in a read/write embodiment, electrostatic exciter 12 is arranged to transmit a transmitted write signal 36 to radio frequency identification tag 16. Most preferably, transmitted write signal 36 is a modulation of exciter signal 34. Within tag circuit 15, write decoder circuit 54 decodes, i.e., demodulates, transmitted write signal 36 to recover the write information and communicates the write information to controller 59. Controller 59 initiates a write operation during which the write information is communicated to and retained within memory 56 as part of the stored tag information. The updated stored tag information forms the basis for read signal 38. It will be appreciated that the transmitted write signal 36 may be an operation code or command. In this case, write decoder circuit 54 is arranged to decode the operation code or command.

Figure 7:
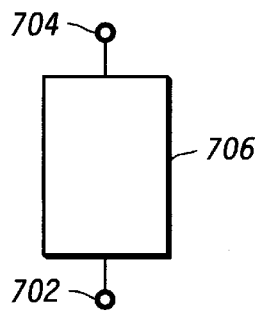
FIG. 7 is a block diagram illustration of a radio frequency identification tag in accordance with a preferred embodiment of the present invention.

Referring to FIG. 7, an alternative preferred radio frequency identification tag 700 for use in radio frequency identification tag system 10 is shown. Radio frequency identification tag 700 includes a tag common electrode 702 and a tag antenna element 704 coupled to a tag circuit 706. Tag common electrode 702 is arranged to couple to ground. In a preferred embodiment (not shown), tag common electrode 702 may be arranged to couple to a person or an animal. In this manner, tag common electrode 702 is coupled to ground by means of the person or animal. Tag common electrode 702 may also be arranged to couple to an article (not shown). In this manner, tag common electrode 702 is coupled to ground by means of the article. In preferred applications, the article may be a loaned, leased, or rented article, such as, for example, a video medium, an audio medium, a computer program, a computer game, a video game or a book. The article may also be a retail sales article. Tag antenna element 704 is arranged to electrostatically couple exciter signal 34. In a read/write embodiment, tag circuit 706 is preferably constructed from the aforementioned TEMIC e5550 circuit chip, while in a read-only application, tag circuit 706 is preferably constructed from the Motorola Indala I341 circuit chip.

Each of tag common electrode 702 and tag antenna element 704 are preferably arranged to magnetically store tag state information. The tag state information is representative of exactly one state of two possible states. In this regard, each of tag common electrode 702 and tag antenna element 704 is preferably formed from a magnetic strip. Each magnetic strip is arranged as a single bit EAS strip for storing the magnetically programmable tag state information. When radio frequency identification tag 700 is proximate magnetic reader 18, magnetic reader magnetically reads the tag state information from tag common electrode 702 and tag antenna element 704.

Figure 2:
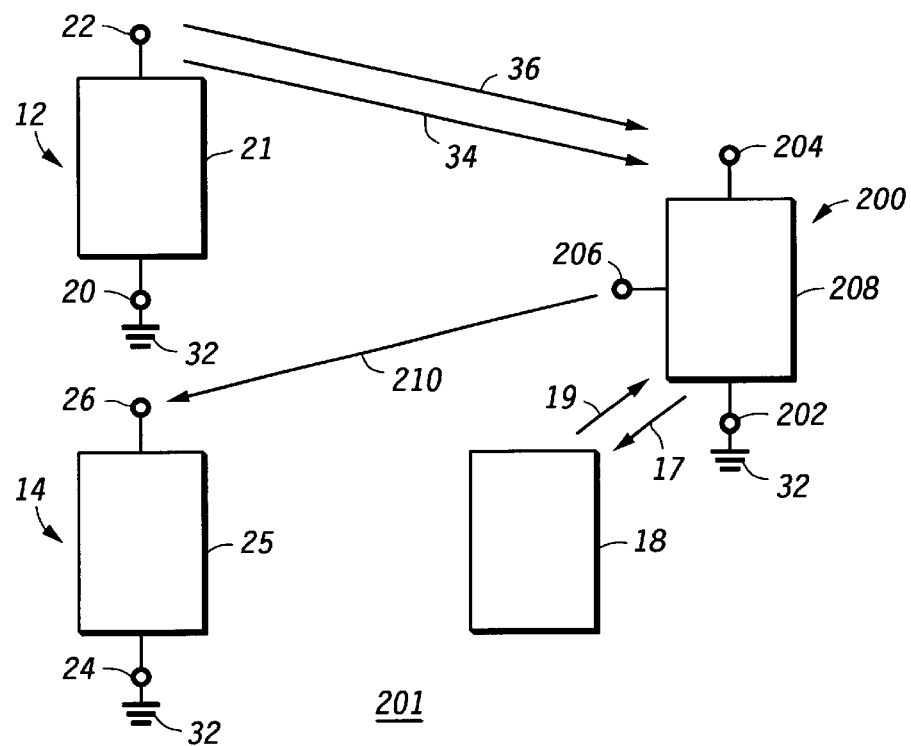
FIG. 2 is a block diagram illustration of a radio frequency identification tag system in accordance with an alternate preferred embodiment of the present invention.
Figure 6:
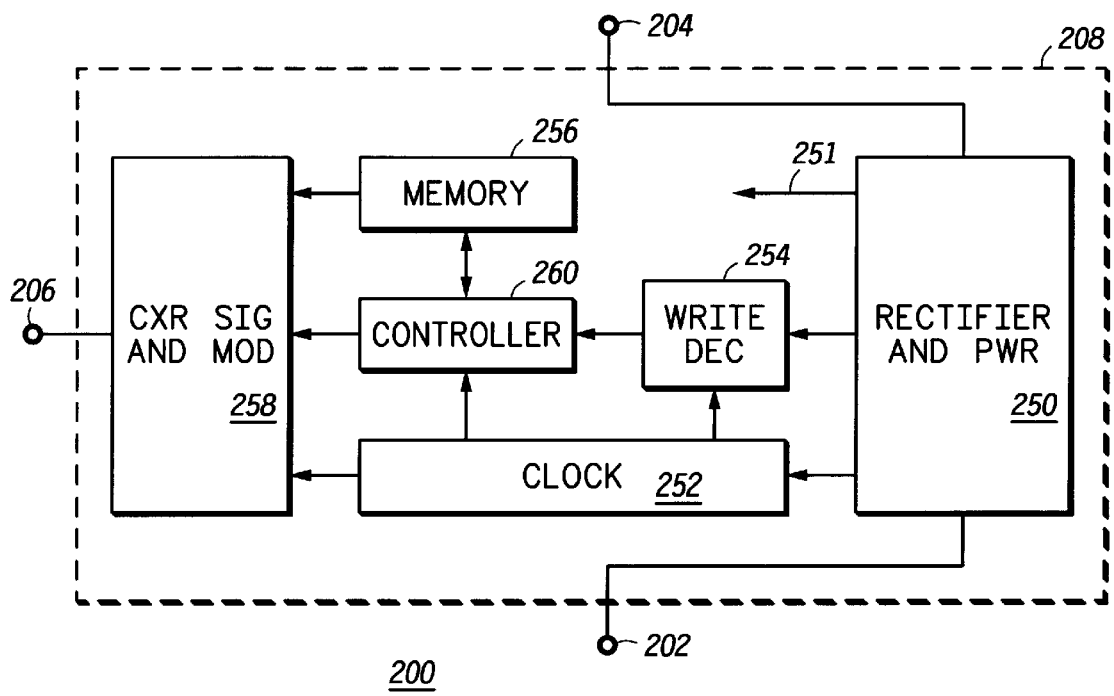
FIG. 6 is a block diagram illustration of a radio frequency identification tag in accordance with a preferred embodiment of the present invention.

With reference to FIG. 2 and FIG. 6, a radio frequency identification tag system 201 includes: 1) a proximately-located electrostatic exciter 12, 2) a proximately-located electrostatic reader 14, 3) a radio frequency identification tag 200 and 4) a proximately-located magnetic reader 18. Electrostatic exciter 12, electrostatic reader 14 and magnetic reader 18 are arranged as discussed with respect to radio frequency identification tag system 10 above. Radio frequency identification tag 200 includes a tag common electrode 202, a first tag antenna element 204 and a second tag antenna element 206 coupled to a tag circuit 208. In the preferred implementation of the invention shown, exciter common electrode 20, reader common electrode 24 and tag common electrode 202 are coupled to ground 32.

Electrostatic exciter 12 provides an exciter signal 34. When radio frequency identification tag 200 is proximate electrostatic exciter 12, exciter signal 34 is electrostatically coupled, through the air, from exciter antenna element 22 to first tag antenna element 204. Radio frequency identification tag 200 becomes energized based upon exciter signal 34. In accordance with the tag circuit 208 and stored tag information of radio frequency identification tag 200, radio frequency identification tag 200 generates a read signal 210 containing some or all of the stored tag information, which is communicated from tag circuit 208 to second tag antenna element 206. Read signal 210 is electrostatically coupled from second tag antenna element 206 to reader antenna element 26. Electrostatic reader 14 receives read signal 210, demodulates/decodes read signal 210 to recover the stored tag information therefrom and, as appropriate, communicates the stored tag information to other system elements (not shown). In a preferred implementation, read signal 210 is a transmitted signal modulated by means of an amplitude modulation (AM), a frequency modulation (FM) or a phase modulation (PM) to convey the stored tag identification.

Referring to FIG. 6, in a read/write embodiment of the present invention radio frequency identification tag 200 is advantageously constructed from a derivative of the aforementioned TEMIC e5550 circuit chip. In this regard, and with reference to FIG. 6, tag circuit 208 includes operatively coupled: 1) a rectifier and tag power circuit 250, 2) a clock circuit 252, 3) a write decoder circuit 254, 4) a memory 256, 5) a carrier signal and/or modulator circuit 258 and 6) a controller 260. More particularly, first tag antenna element 204 is coupled to rectifier and tag power circuit 250, and carrier signal and/or modulator circuit 258 is coupled to second tag antenna element 206. Upon becoming energized by exciter signal 34, rectifier and tag power circuit 250 provides a direct current (dc) power supply 251. Exciter signal 34 is further coupled from first tag antenna element 204 via rectifier and tag power circuit 250 to write decoder circuit 254 and clock circuit 252. Clock circuit 252 provides a clock signal to each of write decoder circuit 254, carrier signal and/or modulator circuit 258 and controller 260. Memory 256 retains the stored tag information and is accessed by controller 260 and carrier signal and/or modulator circuit 258. Upon excitation, carrier signal and/or modulator circuit 258 generates a read signal 210 with an appropriate modulation and couples it to second tag antenna element 206. Preferably read signal 210 is a transmitted signal modulated by means of at least one of an amplitude modulation, a frequency modulation or a phase modulation based upon the stored tag information. Read signal 210 is electrostatically coupled from second tag antenna element 206 to reader antenna element 26. In an alternate, read-only embodiment, the aforementioned Motorola Indala I341 circuit chip may be used. It will be appreciated that in this embodiment write decoder circuit 254 is not included.

Tag common electrode 202 is arranged to couple to ground. In a preferred embodiment (not shown), tag common electrode 202 may be arranged to couple to a person or an animal. In this manner, tag common electrode 202 is coupled to ground by means of the person or animal. Tag common electrode 202 may also be arranged to couple to an article (not shown). In this manner, tag common electrode 202 is coupled to ground by means of the article. In preferred applications, the article may be a loaned, leased or rented article, such as, for example, a video medium, an audio medium, a computer program, a computer game, a video game or a book. The article may also be a retail sales article.

In accordance with a preferred embodiment of the present invention, exactly one of tag common electrode 202, first tag antenna element 204 and second tag antenna element 206 is arranged for magnetically storing tag state information. The tag state information is representative of exactly one state of two possible states. In this regard, the exactly one of tag common electrode 202, first tag antenna element 204 and second tag antenna element 206 is formed from a magnetic strip. The magnetic strip is preferably a single bit EAS magnetic strip—a suitable magnetic strip material being the aforementioned 3M magnetic strip sold under the product name Tattle Tape. The magnetic strip is arranged as a single bit EAS strip for storing the magnetically programmable tag state information. The magnetic strip is further arranged, as appropriate, as an effective tag common electrode 202, a first tag antenna element 204 or second tag antenna element 206 for operation as described.

As shown in FIG. 2, radio frequency identification tag system 201 includes, in addition to proximately-located electrostatic exciter 12 and proximately-located electrostatic reader 14, a proximately-located magnetic reader 18. When radio frequency identification tag 200 is proximate magnetic reader 18, magnetic reader 18 reads the magnetically stored tag state information and conveys that information to EAS system elements (not shown). Magnetic reader 18 provides an excitation signal 19. Depending on the programming state of the magnetic strip, the magnetic strip will resonate producing a resonant signal 17. Resonant signal 17 is detected by magnetic reader 18 to determine the tag state information.

With continued reference to FIG. 2 and FIG. 6, in a read/write embodiment, electrostatic exciter 12 is arranged to transmit a transmitted write signal 36 to radio frequency identification tag 200. Most preferably, transmitted write signal 36 is a modulation of exciter signal 34. Within tag circuit 208, write decoder circuit 254 decodes, i.e., demodulates, transmitted write signal 36 to recover the write information and communicates the write information to controller 260. Controller 260 initiates a write operation during which the write information is communicated to and retained within memory 256 as part of the stored tag information. The updated stored tag information forms the basis for read signal 210. It will be appreciated that the transmitted write signal 36 may be an operation code or command. In this case, write decoder circuit 254 is arranged to decode the operation code or command.

Figure 8:
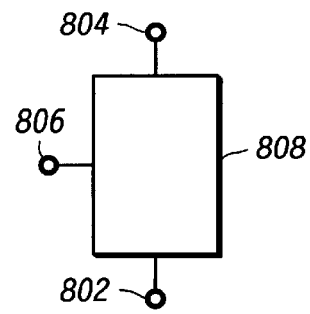
FIG. 8 is a block diagram illustration of a radio frequency identification tag in accordance with a preferred embodiment of the present invention.

With reference to FIG. 8, an alternate preferred embodiment radio frequency identification tag 800 shown. Radio frequency identification tag 800 is arranged for use in, for example, radio frequency identification tag system 40. Radio frequency identification tag 800 includes tag common electrode 802, first tag antenna element 804 and second tag antenna element 806 coupled to tag circuit 808. Tag common electrode 802 is arranged to couple to ground. In a preferred embodiment (not shown), tag common electrode 802 may be arranged to couple to a person or an animal. In this manner, tag common electrode 802 is coupled to ground by means of the person or animal. Tag common electrode 802 may also be arranged to couple to an article (not shown). In this manner, tag common electrode 802 is coupled to ground by means of the article. In preferred applications, the article may be a loaned, leased or rented article such as, for example, a video medium, an audio medium, a computer program, a computer game, a video game or a book. The article may also be a retail sales article. First tag antenna element 804 is arranged for electrostatically coupling exciter signal 34. Second tag antenna element 806 is arranged for electrostatically sending read signal 210. In a read/write embodiment, tag circuit 808 is preferably constructed from a derivative of the aforementioned TEMIC e5550 circuit chip, while in a read-only application, tag circuit 808 is preferably constructed from the Motorola Indala I341 circuit chip.

Exactly two of tag common electrode 802, first tag antenna element 804 and second tag antenna element 806 are preferably arranged for magnetically storing tag state information. The tag state information is representative of exactly one state of two possible states. In this regard, the exactly two of tag common electrode 802, first tag antenna element 804 and second tag antenna element 806 are preferably formed from a magnetic strip. Each magnetic strip is arranged as a single bit EAS strip for magnetically storing the tag state information. When radio frequency identification tag 800 is proximate magnetic reader 18, magnetic reader magnetically reads the tag state information from the exactly two of tag common electrode 802, first tag antenna element 804 and second tag antenna element 806 arranged to store magnetically programmed tag state information. One will appreciate that any combination of two of tag common electrode 802, first tag antenna element 804 and second tag antenna element 808 may be arranged from magnetically storing tag state information.

Figure 9:
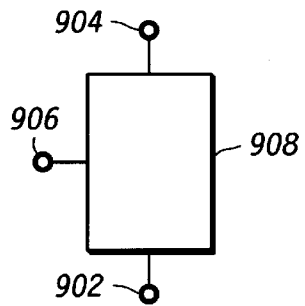
FIG. 9 is a block diagram illustration of a radio frequency identification tag in accordance with a preferred embodiment of the present invention.

With reference to FIG. 9, an alternate preferred embodiment radio frequency identification tag 900 shown. Radio frequency identification tag 900 is arranged for use in, for example, radio frequency identification tag system 40. Radio frequency identification tag 900 includes tag common electrode 902, first tag antenna element 904 and second tag antenna element 906 coupled to tag circuit 908. Tag common electrode 902 is arranged to couple to ground. In a preferred embodiment (not shown), tag common electrode 902 may be arranged to couple to a person or an animal. In this manner, tag common electrode 902 is coupled to ground by means of the person or animal. Tag common electrode 902 may also be arranged to couple to an article (not shown). In this manner, tag common electrode 902 is coupled to ground by means of the article. In preferred applications, the article may be a loaned, leased or rented article such as, for example, a video medium, an audio medium, a computer program, a computer game, a video game or a book. The article may also be a retail sales article. First tag antenna element 904 is arranged for electrostatically coupling exciter signal 34. Second tag antenna element 906 is arranged for electrostatically sending read signal 210. In a read/write embodiment, tag circuit 908 is preferably constructed from a derivative of the aforementioned TEMIC e5550 circuit chip, while in a read-only application, tag circuit 908 is preferably constructed from the Motorola Indala I341 circuit chip.

Tag common electrode 902, first tag antenna element 904 and second tag antenna element 906 are preferably arranged to magnetically store tag state information. The tag state information is representative of exactly one state of two possible states. In this regard, each of tag common electrode 902, first tag antenna element 904 and second tag antenna element 906 is preferably formed from a magnetic strip. Each magnetic strip is arranged as a single bit EAS strip for storing the magnetically programmable tag state information. When radio frequency identification tag 900 is proximate to magnetic reader 18, magnetic reader 18 magnetically reads the tag state information from tag common electrode 902, first tag antenna element 904 and second tag antenna element 906.

Figure 3:
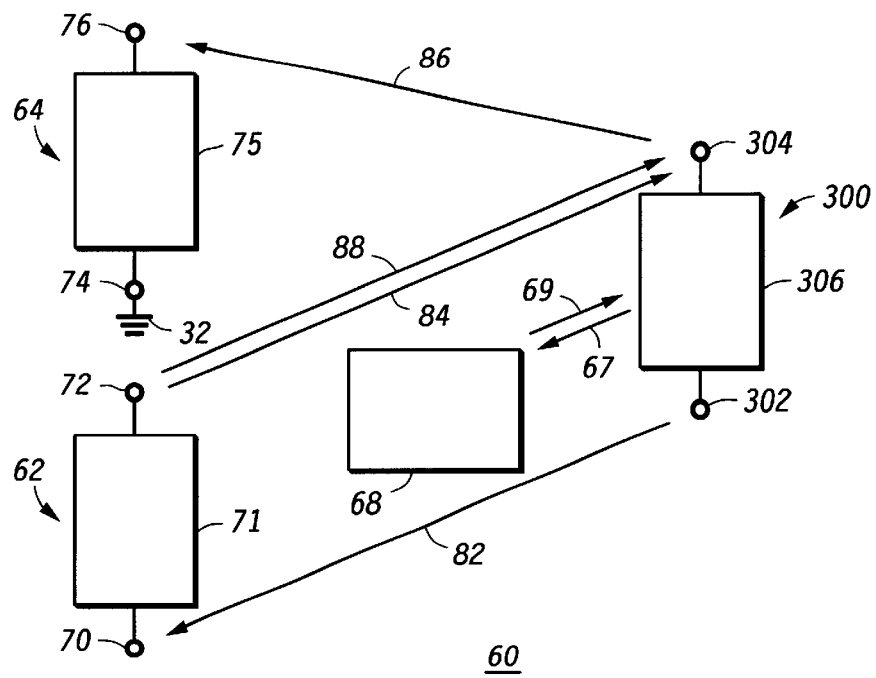
FIG. 3 is a block diagram illustration of a radio frequency identification tag system in accordance with an alternate preferred embodiment of the present invention.

Referring now to FIG. 3, a radio frequency identification tag system 60 includes 1) a electrostatic exciter 62, 2) a electrostatic reader 64, 3) a radio frequency identification tag 300 and 4) a magnetic reader 68. Electrostatic exciter 62 includes a first exciter antenna element 70 and second exciter antenna element 72 coupled to an exciter circuit 71. Electrostatic reader 64 includes a reader common electrode 74 and a reader antenna element 76 coupled to a reader circuit 75. Radio frequency identification tag 300 includes a first tag antenna element 302 and a second tag antenna element 304 coupled to a tag circuit 306. In the preferred implementation of the invention shown reader common electrode 74 is coupled to ground 32. First tag antenna element 302 and second tag antenna element 304 are arranged for electrostatically coupling an exciter signal 82 and an exciter signal 84 from first exciter antenna element 70 and second exciter antenna element 72, respectively.

More particularly, electrostatic exciter 62 provides an exciter signal 82 and an exciter signal 84. When radio frequency identification tag 300 is proximate to electrostatic exciter 62, exciter signal 82 is electrostatically coupled, through the air, between first exciter antenna element 70 and first tag antenna element 302 and exciter signal 84 is electrostatically coupled between exciter antenna element 72 and tag antenna element 304. Tag circuit 306 becomes energized based upon exciter signal 82 and exciter signal 84. In accordance with the stored tag information of radio frequency identification tag 300, tag circuit 306 generates a read signal 86 containing some or all of the stored tag information, which is communicated from tag circuit 306 to second tag antenna element 304. Read signal 86 is sent electrostatically from second tag antenna element 304 to reader antenna element 76. Electrostatic reader 64 receives read signal 86, demodulates/decodes read signal 86 to recover the stored tag information therefrom and, as appropriate, communicates the stored tag information to other system elements (not shown). In a preferred implementation, read signal 86 is a reflected signal modulated by means of reflected load modulation based upon the stored tag information. It will be appreciated that other forms of modulation such as amplitude modulation (AM), frequency modulation (FM) or phase modulation (PM) may be used to convey the stored tag identification.

Electrostatic exciter 62 may be advantageously constructed from available tag exciter circuitry, such as for example, the aforementioned Motorola Indala Corporation's ASR-120 base station. The ASR-120 device is adapted by forming and coupling a suitable exciter electrode, for example a copper plate electrode, to each of the dipole electrode connections, thereby forming first exciter antenna element 70 and second exciter antenna element 72. As the ASR-120 is also adaptable to receive from a radio frequency identification tag the stored tag information, one will appreciate that it may be further adapted to include the reader antenna element 76 coupled to the read electrode connection.

Radio frequency identification tag 300 may be arranged for attaching to an article (not shown). In preferred applications, the article may be a loaned, leased or rented article such as, for example, a video medium, an audio medium, a computer program, a computer game, a video game or a book. The article may also be a retail sales article. Radio frequency identification tag 300 may also be arranged for attaching to a person or an animal (not shown). In a read/write embodiment, tag circuit 306 is preferably constructed from the aforementioned TEMIC e5550 circuit chip, while in a read-only application, tag circuit 306 is preferably constructed from the Motorola Indala I341 circuit chip.

In accordance with a preferred embodiment of the present invention, exactly one of first tag antenna element 302 and second tag antenna element 304 is arranged for magnetically storing tag state information. The tag state information is representative of exactly one state of two possible states. In this regard, exactly one of first tag antenna element 302 and second tag antenna element 304 is formed from a magnetic strip. The magnetic strip is preferably a single bit EAS magnetic strip—a suitable magnetic strip material being the aforementioned 3M magnetic strip sold under the product name Tattle Tape. The magnetic strip is arranged as a single bit EAS strip for storing the magnetically programmable tag state information. The magnetic strip is further arranged, respectively, as an effective first tag antenna element 302 or as a second tag antenna element 304 for operation as described.

As shown in FIG. 3, radio frequency identification tag system 60 includes, in addition to proximately-located electrostatic exciter 62 and proximately-located electrostatic reader 64 a proximately-located magnetic reader 68. When radio frequency identification tag 300 is proximate magnetic reader 68, magnetic reader 68 reads the magnetically stored tag state information and conveys that information to EAS system elements (not shown). Magnetic reader 68 provides an excitation signal 69. Depending on the programming state of the magnetic strip, the magnetic strip will resonate producing a resonant signal 67. Resonant signal 67 is detected by magnetic reader 68 to determine the tag state information.

With continued reference to FIG. 3 in a read/write embodiment, electrostatic exciter 62 is arranged to transmit a transmitted write signal 88 to radio frequency identification tag 300. Within tag circuit 306, a write decoder decodes, i.e., demodulates, transmitted write signal 88 to recover the write information and to, as appropriate, update the stored tag information. Transmitted write signal 88 may also include an operation code or a command. The updated stored tag information forms the basis for read signal 86.

Figure 10:
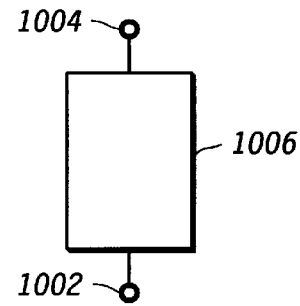
FIG. 10 is a block diagram illustration of a radio frequency identification tag in accordance with a preferred embodiment of the present invention.

Referring to FIG. 10, an alternative preferred radio frequency identification tag 1000 for use in radio frequency identification tag system 60 is shown. Radio frequency identification tag 1000 includes a first tag antenna element 1002 and a second tag antenna element 1004 coupled to a tag circuit 1006. First tag antenna element 1002 and second tag antenna element 1004 are arranged for electrostatically coupling exciter signal 82 and exciter signal 84, respectively. Radio frequency identification tag 1000 is also arranged for attaching to an article. In referred applications (not shown), the article may be a loaned, leased or rented article, such as, for example, a video medium, an audio medium, a computer program, a computer game, a video game or a book. The article may further be a retail sales article. Radio frequency identification tag 1000 may also be arranged for attaching to a person or an animal (not shown). In a read/write embodiment, tag circuit 1006 is preferably constructed from the aforementioned TEMIC e5550 circuit chip, while in a read-only application, tag circuit 1006 is preferably constructed from the Motorola Indala I341 circuit chip.

Each of first tag antenna element 1002 and second tag antenna element 1004 are preferably arranged to magnetically store tag state information. The tag state information is representative of exactly one state of two possible states. In this regard, each of first tag antenna element 1002 and second tag antenna element 1004 are preferably formed from a magnetic strip. Each magnetic strip is arranged as a single bit EAS strip for storing the magnetically programmable tag state information. When radio frequency identification tag 1000 is proximate magnetic reader 68, magnetic reader magnetically reads the tag state information from first tag antenna element 1002 and second tag antenna element 1004.

Figure 4:
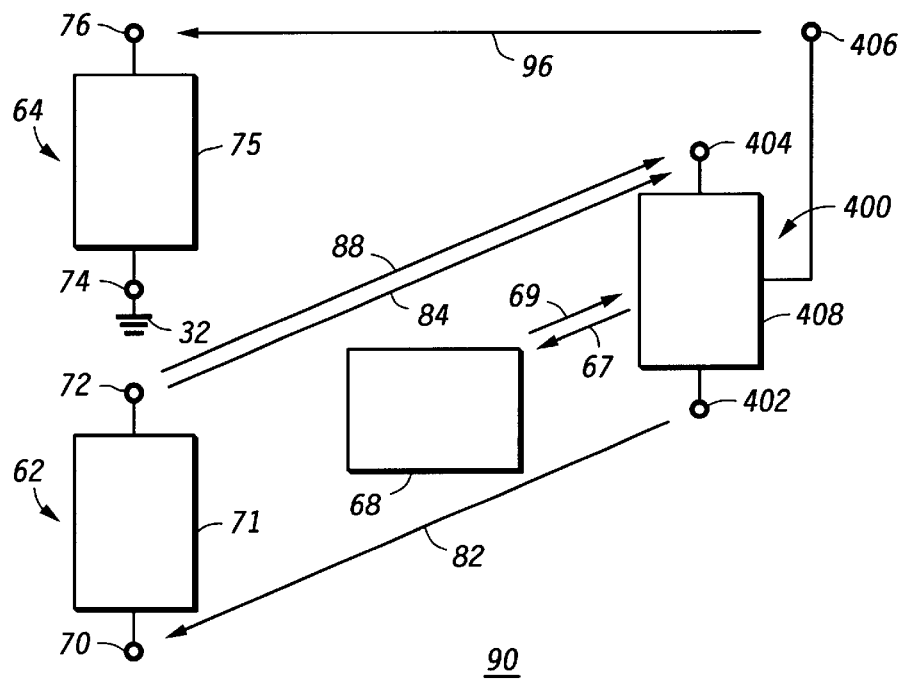
FIG. 4 is a block diagram illustration of a radio frequency identification tag system in accordance with an alternate preferred embodiment of the present invention.

Referring now to FIG. 4, a radio frequency identification tag system 90 includes 1) a proximately-located electrostatic exciter 62, 2) a proximately-located electrostatic reader 64, 3) a radio frequency identification tag 400 and 4) a proximately-located magnetic reader 68. Electrostatic exciter 62, electrostatic reader 64 and magnetic reader 68 are arranged as discussed above with respect to radio frequency identification tag system 90. Radio frequency identification tag 400 includes a first tag antenna element 402, a second tag antenna element 404 and a third tag antenna element 406 coupled to a tag circuit 408. In the preferred implementation of the invention shown reader common electrode 74 is coupled to ground 32. First tag antenna element 402 and second tag antenna element 404 are arranged for electrostatically coupling an exciter signal 82 and an exciter signal 84 from first exciter antenna element 70 and second exciter antenna element 72, respectively.

More particularly, electrostatic exciter 62 provides an exciter signal 82 and an exciter signal 84. When radio frequency identification tag 400 is proximate electrostatic exciter 62, exciter signal 82 is electrostatically coupled, through the air, between first exciter antenna element 70 and first tag antenna element 402, and exciter signal 84 is electrostatically coupled between second exciter antenna element 72 and second tag antenna element 404. Tag circuit 408 becomes energized based upon exciter signal 82 and exciter signal 84. In accordance with the stored tag information of radio frequency identification tag 400, tag circuit 408 generates a read signal 96 containing some or all of the stored tag information, which is communicated from tag circuit 408 to third tag antenna element 406. Read signal 96 is sent electrostatically from third tag antenna element 406 to reader antenna element 76. Electrostatic reader 64 receives read signal 96, demodulates/decodes read signal 96 to recover the stored tag information therefrom and, as appropriate, communicates the stored tag information to other system elements (not shown). In a preferred implementation, read signal 96 is a transmitted signal modulated by means of at least one of an amplitude modulation (AM), a frequency modulation (FM) or a phase modulation (PM) to convey the stored tag identification.

Radio frequency identification tag 400 may be arranged for attaching to an article. In preferred applications, the article may be a loaned, leased or rented article, such as, for example, a video medium, an audio medium, a computer program, a computer game, a video game or a book. The article may also be a retail sales article. Radio frequency identification tag 400 may also be arranged for attaching to a person or an animal. In a read/write embodiment, tag circuit 408 is preferably constructed from a derivative of the aforementioned TEMIC e5550 circuit chip, while in a read-only application, tag circuit 408 is preferably constructed from the Motorola Indala I341 circuit chip.

In accordance with a preferred embodiment of the present invention, exactly one of the first tag antenna element 402, second tag antenna element 404 and third tag antenna element 406 is arranged for magnetically storing tag state information. The tag state information is representative of exactly one state of two possible states. In this regard, the exactly one of first tag antenna element 402, second tag antenna element 404 and third tag antenna element 406 is formed from a magnetic strip. The magnetic strip is preferably a single bit EAS magnetic strip—a suitable magnetic strip material being the aforementioned 3M magnetic strip sold under the product name Tattle Tape. The magnetic strip is arranged as a single bit EAS strip for storing the magnetically programmable tag state information. The magnetic strip is further arranged, respectively, as an effective first tag antenna element 402, second tag antenna element 404 or third tag antenna element 406 for operation as described.

As shown in FIG. 4, radio frequency identification tag system 90 includes, in addition to proximately-located electrostatic exciter 62 and proximately-located electrostatic reader 64 a proximately-located magnetic reader 68. When radio frequency identification tag 400 is proximate magnetic reader 68, magnetic reader 68 reads the magnetically stored tag state information and conveys that information to EAS system elements (not shown). Magnetic reader 68 provides an excitation signal 69. Depending on the programming state of the magnetic strip, the magnetic strip will resonate producing a resonant signal 67. Resonant signal 67 is detected by magnetic reader 68 to determine the tag state information.

With continued reference to FIG. 4 in a read/write embodiment, electrostatic exciter 62 is arranged to transmit a transmitted write signal 88 to radio frequency identification tag 400. Within tag circuit 408, a write decoder decodes, i.e., demodulates, transmitted write signal 88 to recover the write information and to, as appropriate, update the stored tag information. Transmitted write signal 88 may also include an operation code or a command. The updated stored tag information forms the basis for read signal 96.

Figure 11:
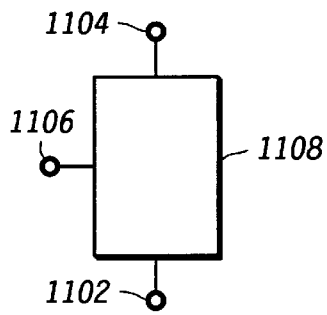
FIG. 11 is a block diagram illustration of a radio frequency identification tag in accordance with a preferred embodiment of the present invention.

Referring to FIG. 11, an alternative preferred radio frequency identification tag 1100 for use in radio frequency identification tag system 90 is shown. Radio frequency identification tag 1100 includes a first tag antenna element 1102, a second tag antenna element 1104 and a third tag antenna element 1106 coupled to a tag circuit 1108. First tag antenna element 1102 and second tag antenna element 1104 are arranged for electrostatically coupling exciter signal 82 and exciter signal 84. Third tag antenna element 1106 is arranged for sending read signal 96. Radio frequency identification tag 1100 is also arranged for attaching to an article (not shown). In preferred applications, the article may be a loaned, leased or rented article, such as, for example, a video medium, an audio medium, a computer program, a computer game, a video game or a book. The article may also be a retail sales article. Radio frequency identification tag 1100 may also be arranged for attaching to a person or an animal (not shown). In a read/write embodiment, tag circuit 1108 is preferably constructed from a derivative of the aforementioned TEMIC e5550 circuit chip, while in a read-only application, tag circuit 1108 is preferably constructed from the Motorola Indala I341 circuit chip.

Exactly two of first tag antenna element 1102, second tag antenna element 1104 and third tag antenna element 1106 are preferably arranged to magnetically store tag state information. The tag state information is representative of exactly one state of two possible states. In this regard, the exactly two of first tag antenna element 1102, second tag antenna element 1104 and third tag antenna element 1106 are preferably formed from a magnetic strip. Each magnetic strip is arranged as a single bit EAS strip for storing the magnetically programmable tag state information. When radio frequency identification tag 1100 is proximate magnetic reader 68, magnetic reader magnetically reads the tag state information from the exactly two of first tag antenna element 1102, second tag antenna element 1104 and third tag antenna element 1106. It will be appreciated that any combination of two of first tag antenna element 1102, second tag antenna element 1104 and third tag antenna element 1106 may be arranged for magnetically storing tag state information.

Figure 12:
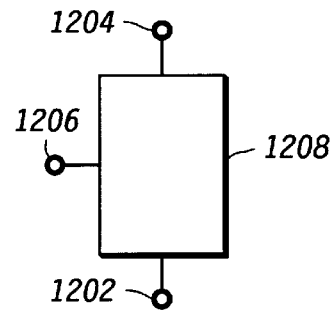
FIG. 12 is a block diagram illustration of a radio frequency identification tag in accordance with a preferred embodiment of the present invention.

Referring to FIG. 12, an alternative preferred radio frequency identification tag 1200 for use in radio frequency identification tag system 90 is shown. Radio frequency identification tag 1200 includes a first tag antenna element 1202, a second tag antenna element 1204 and a third tag antenna element 1206 coupled to a tag circuit 1208. First tag antenna element 1202 and second tag antenna element 1204 are arranged for electrostatically receiving exciter signal 82 and exciter signal 84. Third tag antenna element 1206 is arranged for sending transmitted write signal 96. Radio frequency identification tag 1200 is also arranged for attaching to an article (not shown). In preferred applications, the article may be a loaned, leased or rented article, such as, for example, a video medium, an audio medium, a computer program, a computer game, a video game or a book. The article may also be a retail sales article. Radio frequency identification tag 1200 may also be arranged for attaching to a person or an animal (not shown). In a read/write embodiment, tag circuit 1208 is preferably constructed from a derivative of the aforementioned TEMIC e5550 circuit chip, while in a read-only application, tag circuit 1208 is preferably constructed from the Motorola Indala I341 circuit chip.

Each of first tag antenna element 1202, second tag antenna element 1204 and third tag antenna element 1206 are preferably arranged to magnetically store tag state information. The tag state information is representative of exactly one state of two possible states. In this regard, each of first tag antenna element 1202, second tag antenna element 1204 and third tag antenna element 1206 are preferably formed from a magnetic strip. Each magnetic strip is arranged as a single bit EAS strip for storing the magnetically programmable tag state information. When radio frequency identification tag 1200 is proximate magnetic reader 68, magnetic reader magnetically reads the tag state information from each of first tag antenna element 1202, second tag antenna element 1204 and third tag antenna element 1206.

Fabrication of radio frequency identification ("RFID") tags, in accordance with the present invention, is now discussed. Using an adhesive-backed substrate, a dipole antenna comprising a first tag electrode and a second tag electrode is constructed using a conductive medium such as carbon ink, silver ink or a metallic strip, such as the aforementioned EAS Tattle Tape product supplied by 3M. The material resistivity can be as high as several hundred ohms per square. The dipole dimensions can be designed to accommodate a variety of form factor applications. An RFID silicon chip which embodies the tag circuit is then attached to the first and second tag electrodes.

In an "interposer embodiment," the RFID silicon chip is attached to the first and second tag electrodes by means of an interposer. This embodiment is best suited when used with metallic EAS strips. A secondary peel-off adhesive is placed on top of the above assembly to protect the contents and to allow adhesion to both the top and bottom surfaces of interest (such as the case when placed between pages of a book). Once assembled, the product can be concealed within the confines of the book's pages or on bindings or book covers. It can also be disguised as a logo in a "smart label." The interposser embodiment is shown in FIGS. 13–15.

Figure 13:
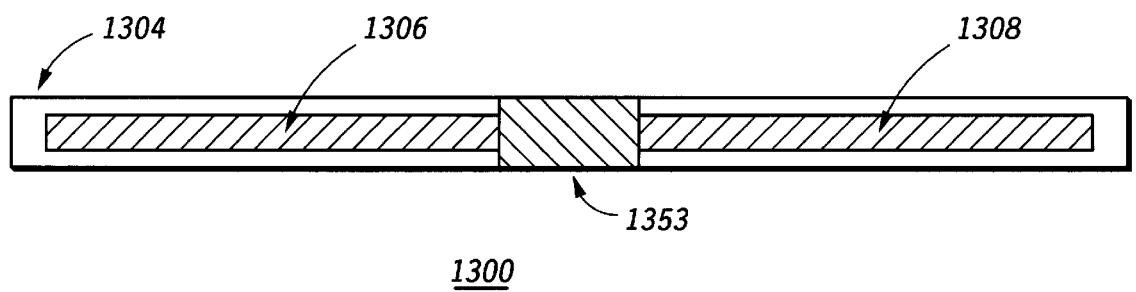
FIG. 13, FIG. 14 and FIG. 15 are schematic illustrations of a preferred embodiment of a radio frequency identification tag of the present invention, wherein the associated radio frequency identification silicon chip is attached to the tag electrodes by means of an interposser.

Referring now to FIG. 13, there is shown a top view of an RFID tag 1300 arranged in accordance with this interposer embodiment. As shown, the RFID tag 1300 includes a tag substrate 1304. Disposed on the substrate 1304 is a first tag electrode 1306 and a second tag electrode 1308. Also shown is an interposser 1353, which interposer includes an RFID silicon chip 1302 (discussed with FIG. 14 below) and is arranged for coupling the RFID silicon chip to the first tag electrode 1306 and the second tag electrode 1308. (Since the back side of the interposser 1353 is shown in this FIG. 13, the RFID silicon chip 1302 is not visible.)

Figure 14:
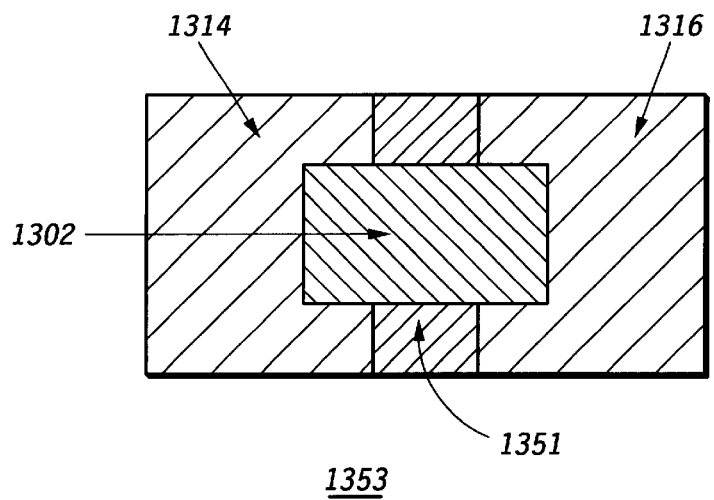

Referring now to FIG. 14, there is shown an enlarged view of the front side of the interposser 1353. As shown, the interposser 1353 includes a substrate 1351. Disposed on the substrate is a first interposer connecting pad 1314 and a second interposer connecting pad 1316. In turn, disposed on the first interposer connecting pad 1314 and the second interposer connecting pad 16 is the RFID silicon chip 1302.

Figure 15:
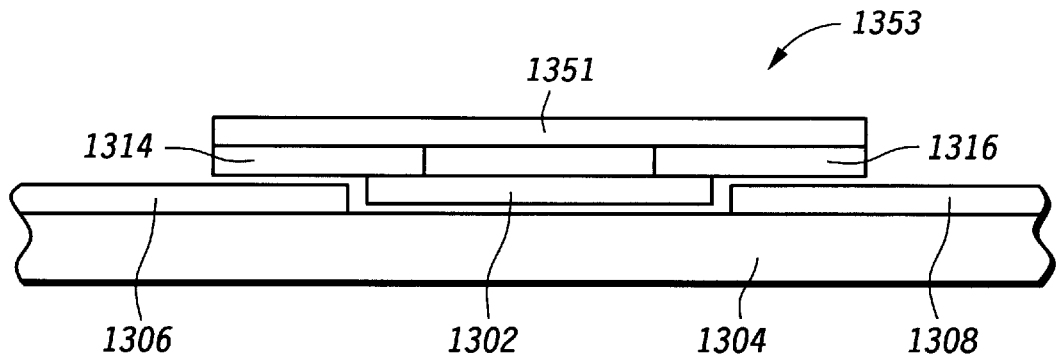

Referring now to FIG. 15, there is shown a side cross-section view of the RFID tag 1300, including a profile view of the interposser 1353. As shown, the first interposer connecting pad 1314 and the second interposer connecting pad 1316 are respectively arranged to bond to the first tag electrode 1306 and the second tag electrode 1308 by means of a suitable conducting adhesive. As a result, the RFID silicon chip 1302 couples to the first tag electrode 1306 and the second tag electrode 1308 by means of the first interposser connecting pad 1314 and the second interposer connecting pad 1316, respectively.

As mentioned above, preferably the conductive media 1306 and 1308 are formed using a magnetic material, such as the magnetic strip product available from 3M under the product name Tattle Tape. In this manner, first tag electrode 1306 and second tag electrode 1308 may be arranged to store tag state information. However, in applications not requiring the additional sensitivity available using magnetic material to form both first tag electrode 1306 and second tag electrode 1308, nonmagnetic conductive medium, such as carbon or silver ink, may be used to form either first tag electrode 1306 or second tag electrode 1308.

Figure 16:
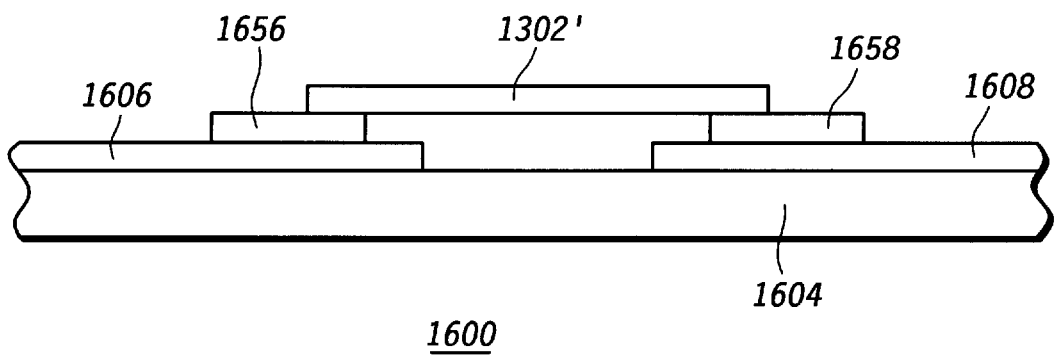
FIG. 16 is a schematic illustration of an alternate preferred embodiment of a radio frequency identification tag of the present invention, wherein the associated radio frequency identification silicon chip is directly attached to the tag electrodes.

In an alternate "direct attachment embodiment," the RFID silicon chip is directly attached to the first and second tag electrodes. Referring now to FIG. 16, there is shown a side cross-section view of an RFID tag 1600 arranged in accordance with this direct attachment embodiment. Similar to the RFID tag 1300 discussed with FIG. 13 above, the RFID tag 1600 includes a tag substrate 1604, together with a first tag electrode 1606 and a second tag electrode 1608 being disposed on the substrate 1604. In turn, disposed on the first tag electrode 1606 is a first connecting pad 1656. Similarly, disposed on the second tag electrode 1608 is a second connecting pad 1658. Finally, disposed on the first connecting pad 1656 and the second connecting pad 1658 is an RFID silicon chip 1302', which chip is otherwise similar to the RFID silicon chip 1302 discussed with the interposser embodiment and FIGS. 13–15 above. As a result, the RFID silicon chip 1302' is directly attached (and coupled) to the first tag electrode 1606 and the second tag electrode 1608. In this embodiment, the RFID silicon chip 1302' can utilize flip chip technology with anisotropic or isotropic mediums, conductive adhesives or any other conventional bonding technique.

In either the interposser embodiment of FIGS. 13–15 or the direct attachment embodiment of FIG. 16, it will be appreciated that each of first tag electrode (1306 or 1606) and second tag electrode (1308 or 1608) may be arranged as a tag common electrode for coupling to ground or as a tag antenna element as the application requires. As well, first tag electrode (1306 or 1606) and second tag electrode (1308 or 1608) serve to electrostatically couple signals to and from radio frequency identification tag (1300 or 1600) while further providing for magnetically storing tag state information. It will be appreciated that only one of the electrodes need be formed from a magnetic material, for cost considerations and where increased sensitivity is not required. Furthermore, as noted above, the magnetically programmed electrode tag state information may be used for activating an EAS alarm, while stored tag information may be used to identify the article.

In summary, referring again to FIG. 1 and FIG. 2, there has been disclosed a radio frequency identification tag system (10 or 201) including an electrostatic exciter 12, an electrostatic reader 14, at least one radio frequency identification tag (16 or 200) and a magnetic reader 18; the electrostatic exciter 12 including an exciter circuit 21, an exciter common electrode 20 and an exciter antenna element 22 coupled to the exciter circuit, the exciter common electrode arranged for coupling to ground 32, the exciter circuit arranged for generating an exciter signal 30 and coupling the exciter signal to the exciter antenna element, the exciter antenna element arranged for electrostatically sending the exciter signal to the at least one radio frequency identification tag; the electrostatic reader including a reader circuit 25 and a reader common electrode 24 and a reader antenna element 26, the reader common electrode arranged for coupling to ground, the reader antenna element arranged for electrostatically receiving a read signal (38 or 210) from the at least one radio frequency identification tag and coupling the read signal to the reader circuit, the at least one radio frequency identification tag including a stored tag information, and the reader circuit arranged for detecting the stored tag information.

Referring now to the radio frequency identification tag system 10 depicted in FIG. 1, there has been disclosed a first embodiment of a radio frequency identification tag 16 including a tag circuit 15, a tag common electrode 28 and a tag antenna element 30 coupled to the tag circuit, the tag common electrode arranged for coupling to ground, the tag antenna element arranged for electrostatically receiving the exciter signal 34 from the exciter antenna element and coupling the exciter signal to the tag circuit; the tag circuit arranged for becoming energized based on the exciter signal, generating a read signal 38 and coupling the read signal to the tag antenna element; the tag antenna element arranged for electrostatically sending the read signal to the reader antenna element and the read signal being a reflected read signal; and exactly one of the tag common electrode and the tag antenna element being arranged to magnetically store tag state information such that the tag state information can be magnetically read by a proximately-located magnetic reader, the tag state information representing exactly one state of two possible states.

Referring now to the radio frequency identification tag system 201 depicted in FIG. 2, there has been disclosed an alternate embodiment of a radio frequency identification tag 200 including a tag circuit 208, a tag common electrode 202, a first tag antenna element 204, and a second tag antenna element 206 coupled to the tag circuit, the tag common electrode arranged for coupling to ground, the first tag antenna element arranged for electrostatically receiving the exciter signal 34 from the exciter antenna element and coupling the exciter signal to the tag circuit; the tag circuit arranged for becoming energized based on the exciter signal, generating a read signal 210 and coupling the read signal to the second tag antenna element; the second tag antenna element arranged for electrostatically sending the read signal 210 to the reader antenna element and the read signal being a transmitted read signal; and exactly one of the tag common electrode, the first tag antenna element and the second tag antenna element being arranged to magnetically store tag state information such that the tag state information can be magnetically read by a proximately-located magnetic reader, the tag state information representing exactly one state of two possible states.

In further summary and referring again to FIG. 3 and FIG. 4, there has been disclosed a radio frequency identification tag system (60 or 90) including an electrostatic exciter 62, an electrostatic reader 64, at least one radio frequency identification tag (300 or 400) and a magnetic reader 68; the electrostatic exciter 62 including an exciter circuit 71, a first exciter antenna element 70 and a second exciter antenna element 72, the exciter circuit arranged for generating an exciter signal (82 and 84) and coupling the exciter signal to the first exciter antenna element and the second exciter antenna element, the first exciter antenna element and the second exciter antenna element arranged for electrostatically sending the exciter signal to the least one radio frequency identification tag; the electrostatic reader including a reader circuit 75 and a reader common electrode 74 and a reader antenna element 76, the reader common electrode arranged for coupling to ground, the reader antenna element arranged for electrostatically receiving a read signal (86 or 96) from the at least one radio frequency identification tag and coupling the read signal to the reader circuit, the at least one radio frequency identification tag including a stored tag information, and the reader circuit arranged for detecting the stored tag information.

Referring now to the radio frequency identification tag system 60 depicted in FIG. 3, there has been disclosed an alternate embodiment of a radio frequency identification tag 300 including a tag circuit 306, a first tag antenna element 302 and a second tag antenna element 304 coupled to the tag circuit, the first tag antenna element and the second tag antenna element arranged for electrostatically receiving the exciter signal from the first exciter antenna element and the second exciter antenna element, respectively, and coupling the exciter signal to the tag circuit; the tag circuit arranged for becoming energized based on the exciter signal, generating a read signal 86 and coupling the read signal to the first tag antenna element; the first tag antenna element arranged for electrostatically sending the read signal to the reader antenna element and the read signal being a reflected read signal; and exactly one of the first tag antenna element and the second tag antenna element being arranged to magnetically store tag state information such that the tag state information can be magnetically read by a proximately-located magnetic reader, the tag state information representing exactly one state of two possible states.

Referring now to the radio frequency identification tag system 90 depicted in FIG. 4, there has been disclosed an alternate embodiment of a radio frequency identification tag 400 including a tag circuit 408, a first tag antenna element 402, a second tag antenna element 404, and a third tag antenna element 406 coupled to the tag circuit, the first tag antenna element and the second tag antenna element arranged for electrostatically receiving the exciter signal from the first exciter antenna element and the second exciter antenna element, respectively, and coupling the exciter signal to the tag circuit; the tag circuit arranged for becoming energized based on the exciter signal, generating a read signal 96 and coupling the read signal to the third tag antenna element; the third tag antenna element arranged for electrostatically sending the read signal 96 to the reader antenna element and the read signal being a transmitted read signal; and exactly one of the first tag antenna element, the second tag antenna element and the third tag antenna element being arranged to magnetically store tag state information such that the tag state information can be magnetically read by a proximately-located magnetic reader, the tag state information representing exactly one state of two possible states.

Some advantages of radio frequency identification tags having magnetically programmed electrodes, in accordance with the present invention, as compared to prior tags, are now discussed.

To begin, radio frequency identification tags of the present invention are less expensive than employing separate EAS and radio frequency identification technologies. In contrast to prior tags that did not use the magnetic EAS material as an integral component of the radio frequency identification embodiment, the present invention combines these two technologies in a single tag. As a result, the present tag's component count is significantly reduced, thus its cost is reduced as well.

Further, the present invention provides the user with significantly more information than is provided by the single-bit magnetic EAS solution alone.

Moreover, the present invention allows the user to continue using existing magnetic EAS systems with the additional benefit of asset management provided by the integrated radio frequency identification technology.

While various embodiments of a radio frequency identification tag arranged for magnetically storing tag state information, in accordance with the present invention, have been described hereinabove, the scope of the invention is defined by the following claims.

We claim:

1. A radio frequency identification tag comprising:

a tag circuit;

a tag common electrode; and a tag antenna element, wherein the tag common electrode and the tag antenna element are coupled to the tag circuit, the tag common electrode is arranged for coupling to ground, the tag antenna element is arranged for capacitively receiving an exciter signal from an exciter and coupling the exciter signal to the tag circuit, the tag circuit is arranged for becoming energized based on the exciter signal, generating a read signal and coupling the read signal to the tag antenna element, the tag antenna element is arranged for capacitively sending the read signal to a reader, and at least one of the tag common electrode and the tag antenna element is arranged for magnetically storing tag state information.

2. The radio frequency identification tag of claim 1, wherein the tag common electrode is further arranged for coupling to an article.

3. The radio frequency identification tag of claim 2, wherein the tag common electrode is further arranged for coupling to ground by means of the article.

4. The radio frequency identification tag of claim 3, wherein the article is a loaned, leased or rented article.

5. The radio frequency identification tag of claim 3, wherein the article is a retail sales article.

6. The radio frequency identification tag of claim 1, wherein the tag common electrode is arranged for coupling to an animal or a person, and wherein the tag common electrode is further arranged for coupling to ground by means f the animal or the person.

7. The radio frequency identification tag of claim 1, wherein the tag antenna element is further arranged for receiving a write signal from the exciter, the write signal comprising write information, and the tag antenna element arranged for capacitively coupling the write signal to the tag circuit, the tag circuit further arranged for storing the write information as a stored tag information, the read signal being modulated by means of reflected load modulation based on the stored tag information.

8. The radio frequency identification tag of claim 7, wherein the read signal being further modulated b means of at least one of an amplitude modulation, a frequency modulation, or a phase modulation.

9. A radio frequency identification tag comprising:

a tag circuit;

a tag common electrode;

a first tag antenna element; and a second tag antenna element, the tag common electrode, the first tag antenna element and the second tag antenna element is coupled to the tag circuit, the tag common electrode is arranged for coupling to ground, the first tag antenna element is arranged for capacitively receiving an exciter signal from an exciter and coupling the exciter signal to the tag circuit, the tag circuit is arranged for becoming energized based on the exciter signal, generating a read signal and coupling the read signal to the second tag antenna element, the second tag antenna element is arranged for capacitively sending the read signal to a reader, at least one of the tag common electrode, the first tag antenna element and the second tag antenna element arranged for magnetically storing tag state information such that the tag state information can be magnetically read by a magnetic reader, the tag state information comprising exactly one state of two possible states.

10. The radio frequency identification tag of claim 9, wherein the tag common electrode is arranged for coupling to an article, the tag common electrode is further arranged for coupling to ground by means of the article.

11. The radio frequency identification tag of claim 10, wherein the article is a retail sales article.

12. The radio frequency identification tag of claim 9, wherein the tag common electrode is arranged for coupling to an animal or a person, the tag common electrode further arranged for coupling to ground by means of the animal or the person.

* * * * *